(12) United States Patent
Ducrot

(10) Patent No.: US 6,948,955 B2
(45) Date of Patent: Sep. 27, 2005

(54) TERMINAL OF A MEDIUM VOLTAGE ELECTRICAL CABLE

(75) Inventor: Alain Ducrot, Valmondois (FR)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/475,699

(22) PCT Filed: Apr. 25, 2002

(86) PCT No.: PCT/US02/13533

§ 371 (c)(1),
(2), (4) Date: Oct. 21, 2003

(87) PCT Pub. No.: WO02/089283

PCT Pub. Date: Nov. 7, 2002

(65) Prior Publication Data

US 2004/0152370 A1 Aug. 5, 2004

(30) Foreign Application Priority Data

Apr. 26, 2001 (EP) ............................................. 01401088

(51) Int. Cl.⁷ .............................................. H01R 13/44
(52) U.S. Cl. ...................................................... 439/149
(58) Field of Search ................................ 439/149, 148, 439/150, 891, 502

(56) References Cited

U.S. PATENT DOCUMENTS

| | | | | |
|---|---|---|---|---|
| 2,780,792 A | * | 2/1957 | Earl | 439/750 |
| 3,210,720 A | * | 10/1965 | Harris, Jr. | 439/518 |
| 3,359,361 A | | 12/1967 | Oakman | |
| 3,519,977 A | * | 7/1970 | Swearingen | 439/135 |
| 5,440,235 A | * | 8/1995 | Oko | 324/538 |
| 6,206,714 B1 | | 3/2001 | Bernardini | |

FOREIGN PATENT DOCUMENTS

| | | |
|---|---|---|
| DE | 21 05 861 | 6/1978 |
| DE | 26 04 650 | 8/1978 |
| EP | 0 435 569 A1 | 7/1991 |
| EP | 0 547 667 A1 | 6/1993 |
| EP | 0 655 805 A1 | 5/1995 |
| EP | 0 849 835 A2 | 6/1998 |
| GB | 1 311 238 | 3/1973 |
| JP | 11 204166 | 7/1999 |

* cited by examiner

Primary Examiner—Phuong Dinh
(74) Attorney, Agent, or Firm—James J. Trussell; Yen Tong Florczak; Melanie G. Gover

(57) ABSTRACT

The invention relates to a terminal (10) for a medium voltage electrical cable (12) comprising a conductor (14) that can be raised to a potential V, characterized in that the terminal is in the form of a body (16; 72) of generally longitudinal shape, which attaches to the conductor of the electrical cable with one of its extremities called the first extremity (18a; 74a), to mechanically fix the conductor to the body, and wherein the body has an opposite extremity, called the second extremity (16b, 16; 76, 72), wherein at least the second extremity portion of the body performs an insulation function.

10 Claims, 2 Drawing Sheets

US 6,948,955 B2

TERMINAL OF A MEDIUM VOLTAGE ELECTRICAL CABLE

FIELD OF THE INVENTION

The present invention relates to a terminal of a medium voltage electrical cable comprising a conductor that can be raised to a potential voltage (V).

DESCRIPTION OF THE ART

The transmission of electrical energy at medium voltages, i.e., at voltages or potentials (V) between about 1 KV and 50 KV, is carried out through electrical cables which typically are connected together via junctions.

When a cable has been installed as described above and is terminated, the end of the cable can be connected to a unit which converts or steps down a voltage, for instance, from 20 KV to 220 V.

When the cable is neither connected to a voltage converting unit, nor to another end of a cable via a junction, it is required to protect the end of the cable at least temporarily, which, in some instances, can be raised to an electrical potential V. This has to be done whilst waiting for the connection of the end of the cable to another end of a cable or to a voltage converting unit, for example, because an extension of the cable network is anticipated.

In this respect, German patent application No. 26 04 650 provides for a method for making cable end terminations. This document discloses that it is required for a conventional crimp connector be mounted on to the conductor of the cable at its end after the insulating layer has been removed over a certain length of the cable. A specific tool is used for crimping the conventional connector on to the conductor of the cable. A further operation is needed to join the connector which is crimped onto the conductor of the cable to a separate plastic tip which has an insulated function.

However, this method suffers from several drawbacks as the method includes several operations which therefore will not allow an easy and quick termination of the cable by an end user. In addition, one of the operations requires a specific tool for crimping the connector on to the conductor of the cable, and the end user who makes the termination of the cable has to deal with several individual components.

Moreover, different connectors are required to fit with different cross-sections of electrical cables ($50^2/95^2/150^2/240^2$ mm$^2$).

It would therefore be useful in the industry to have a new terminal for a medium voltage cable which would be able to be used over various cross-sections of cable, and which could be used with a variety of crimping tools.

The present invention aims at remedying at least one of the above-mentioned drawbacks.

SUMMARY OF THE INVENTION

The present invention provides for a terminal for a medium voltage electrical cable comprising a conductor that can be raised to a potential V, characterized in that the terminal is in the form of a body of generally longitudinal shape, which attaches to the conductor of the electrical cable with one of its extremities, called the first extremity, to mechanically fix the conductor to the body, and wherein the body has an opposite extremity, called the second extremity, wherein at least the portion of the body at the second extremity performs an insulation function.

Advantageously, when it is necessary to make a termination of an electrical cable, there is only the need to mechanically fix the terminal according to the invention to an end of the conductor of the electrical cable, which therefore reduces the number of operations and also takes much less time compared to the known methods. Thus, the operation of termination of the electrical cable is made easier than in the past.

Further, the operation of termination of the electrical cable is made more reliable than in the past since there is no need of using several components (a crimp connector, a separate plastic tip, a number of rubber tapes, etc . . . ).

According to one feature, the body exhibits at its first extremity an internal space to receive the conductor of the electrical cable and comprises means for fixing the conductor inside said internal space.

According to another feature, the fixing means are adapted to cooperate with conductors of different sizes.

Thus, this makes it possible to operate without a great number of connectors each fitted to a particular size of conductor, since the internal space is suited for receiving conductors of different sizes and fixing means can fit with conductors of different sizes to mechanically fix them inside the internal space.

More particularly, the fixing means comprise at least one screwing means adapted to cooperate with conductors of different sizes. For instance, the fixing means can comprise two screwing means. According to this embodiment, the two screwing means are offset along the longitudinal direction of the body.

In a varying embodiment, the two screwing means are transversally offset to one another. The two screwing means may both offset along the longitudinal direction and transversally offset to one another.

For instance, the screwing means may be of the fusible head type, i.e. the head breaks off when exceeding a given torque value which can only be reached when having the body tightly fixed to the conductor. This allows the head of the screwing means to be removed and the screwing means to be flush mounted in the wall of the body surrounding the internal space, when the screwing operation has come to an end and the screwing means terminate in said internal space.

As an alternative, the body can be fixed to the conductor by crimping, soldering, welding, clamping or any other fixing method.

According to another feature, the body is arranged at its first extremity to transmit the potential V from the conductor of the cable to an electrode outside the body of the terminal.

Thus, the terminal according to the invention makes it possible to keep the cable under a predetermined voltage when a termination of said cable is made.

Then, this feature makes it possible to check whether the end of the cable, which is still protected by the terminal, is kept under appropriate voltage. For those applications in which such a verification is not required, it is then possible not to arrange the first extremity of the body of the terminal to transmit the electrical potential V from the conductor to an outer electrode. However, when the body of the terminal is arranged at its first extremity to transmit the potential V from the conductor to an outer electrode, the fixing means itself can at least partially provide transmission of this electrical potential.

In this case, the fixing means can either present the only path for transmitting the potential from the conductor to the outer electrode or cooperate with at least a remaining part of the first extremity of the body so as to also carry out this transmission function of the potential.

According to a first embodiment of the invention, the body of the terminal comprises two integrally joined portions, one, called the first portion, comprising the first extremity and being made of a conductive material, and the other, called the second portion, comprising the second extremity and being made of an insulating material.

The two portions are integrally joined via one of the following and non-exhaustive possibilities: screwing, mechanical jointing, bonding, crimping, stamping, or a heat treatment by melting parts of the insulating material. In the latter case, parts of the insulating material are deformed in such a manner that the two portions fixedly joined so that they form an integral component.

According to a second embodiment, the entire body of the terminal is made of an insulating material, and the means for fixing the conductor inside the internal space is made of a conductive material.

With this configuration, the fixing means represents the only means for transmitting the electrical potential V from the conductor to the outer electrode.

As briefly disclosed above, in some peculiar cases, it is not necessary for the terminal to transmit the electrical potential from the conductor to an outer electrode.

In this particular case, the body of the terminal can be made of an insulating material, and the means for fixing the conductor inside the internal space of the body do not participate to the transmission of the potential from the conductor to the outer electrode but are only adapted to cooperate with conductors of different sizes.

The present invention also provides for a method for protecting an end of a medium voltage electrical cable comprising a conductor that can be raised to a potential V, characterized in that it comprises a single step of mechanical fixing of the end of the conductor to a first extremity of a body of a so-called cable terminal, at least the opposite extremity, called the second extremity, of the body performing an insulation function.

This method is particularly advantageous since the end user who has to make a termination of the end of the cable has only to use the terminal according to the invention and to mechanically fix the end of the conductor of the cable to an extremity of the terminal.

Thus, the method according to the invention is much easier to implement than known methods and reduces to a great extent the time needed for making a termination of the cable.

By virtue of implementation of a single step, the method according to the invention is much more reliable than known methods.

SUMMARY OF THE DRAWINGS

The features and advantages of the present invention will emerge more clearly from the following description, given solely by way of illustration and made with reference to the accompanying drawings, in which.

DETAILED DESCRIPTION OF THE DRAWINGS

Figure 1:
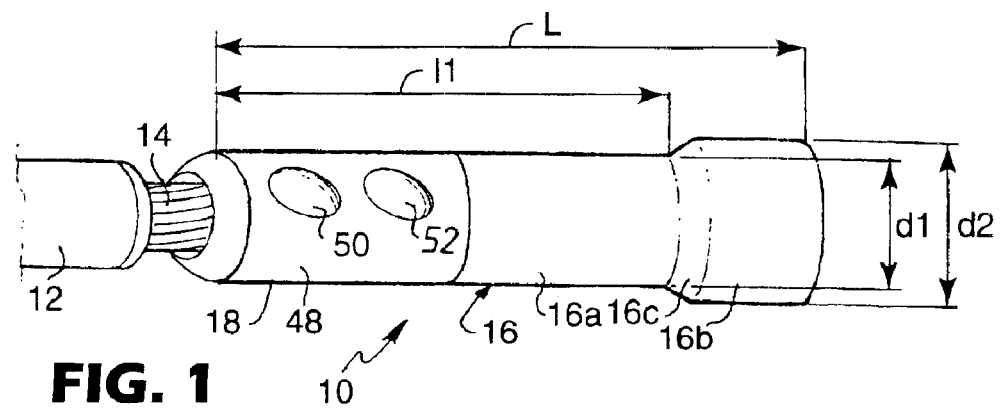
FIG. 1 depicts a perspective view of a conductor of a cable which is mechanically fixed to a terminal according to a first embodiment of the invention.

FIG. 1 schematically represents a perspective view of a terminal 10 of a medium voltage electrical cable 12 which comprises a conductor 14 that can be raised to a potential V.

In this first embodiment, the terminal 10 is in the form of a body 16 of generally longitudinal shape.

The body presents, along a major portion 11, denoted 16a, of its longitudinal dimension L, a substantially cylindrical shape having a substantially constant transverse dimension d1.

This substantially cylindrical shape of the constant transverse dimension allows this terminal to be perfectly enclosed in a radially shrinkable sleeve such as the one disclosed in document EP 0 435 569.

Thus, the radially shrinkable cylindrical sleeve used for enclosing a connection between two electrical cables can be used to enclose the terminal of a cable according to the invention without requiring any modification of the sleeve which has approximately a constant inner diameter.

The body 16 presents, on the remaining portion of its longitudinal dimension L, a substantially cylindrical shape with transverse dimension d2 greater than the transverse dimension d1.

The remaining portion 16b is connected to the major portion 16a via a frusto-conical shaped portion 16c. This portion of greater diameter is used as a sealing of the system when applying the sleeve.

Figure 1A:
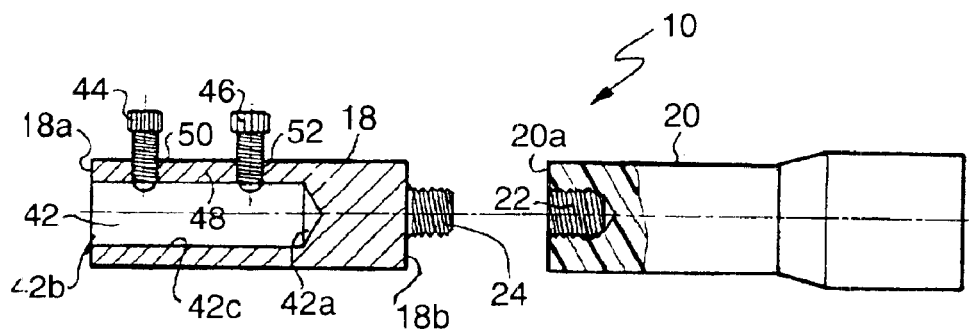
FIG. 1a depicts a longitudinal cross-section of the body of the terminal of FIG. 1 and which comprises two portions which are integrally joined via screwing.

In this embodiment which is also depicted in FIG. 1a, the body 16 comprises two integrally joined portions, one, called the first portion 18 which is arranged at one of its extremities 18a called the first extremity, to mechanically fix the conductor 14 (FIG. 1) of electrical cable 12 to this first portion, and the other, called the second portion 20, which performs an insulation function.

This second portion 20 comprises the portion 16b of greater diameter and a part of the major portion 16a (FIG. 1).

The second portion is made of an insulating material such as for example plastic, and preferably polypropylene.

A threaded hole 22 is provided at the extremity 20a of the second portion and the opposite extremity 18b of the first portion 18 is provided with a thread 24 which is firmly engaged into the threaded hole 22 after a screwing operation is achieved.

Both threaded hole 22 and thread 24 are in alignment with the longitudinal axis of the body of the terminal 10.

It could be envisaged that the thread be part of the second portion 20 and the threaded hole be provided in the first portion 18.

Figure 1B:
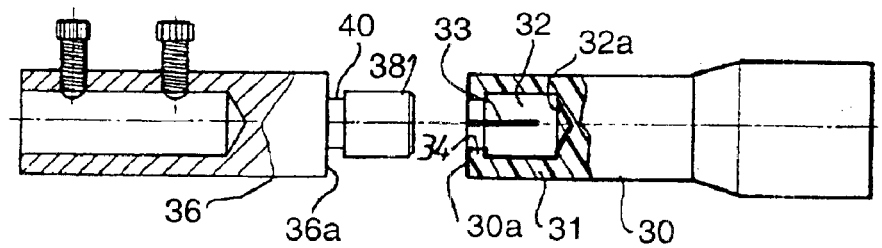
FIG. 1b depicts the terminal according to a variant in which the body comprises two portions which are integrally joined via mechanical jointing.

According to a variant of embodiment partially depicted in FIG. 1b, the two portions are integrally joined via mechanical jointing.

In this variant, the second portion 30 is provided with a longitudinal cavity 32 which is open at an extremity 30a.

The wall 31 surrounding the cavity 32 is provided with two longitudinal slots 33 of which only one is depicted in FIG. 1b.

An annular edge 34 is provided at the opened extremity 30a

On the other hand, the first portion 36 comprises at one extremity 36a a protruding element 38 of lesser diameter than the remaining part of the first portion and an annular recess 40 is provided in a zone of the first portion where the protruding element 38 is fixed to the remaining part of this first portion.

When the protruding element 38 of the first portion 36 is introduced in the cavity 32 of the second portion 30, then the edge 34 engages into the recess 40 due to the resiliency of the material of the second portion 30 and to the slots so as to firmly retain the first portion.

The dimensions of the arrangement specific to the mechanical jointing of both first and second portions have been deliberately exaggerated in FIG. 1b in order to make the invention easier to understand.

Alternatively, the protruding element can be part of the second portion, whereas the cavity can be provided in the first portion.

Other variants for integrally joining two portions of the body can be contemplated by the man skilled in the art and, for example, the two portions can be integrally joined via bonding, crimping, stamping, or a heat treatment by melting parts of the insulating material.

Returning to FIG. 1a, the first portion 18 presents at its extremity 18a corresponding to the first extremity of the whole body 16 (FIG. 1) an internal space 42 which is substantially cylindrical in shape.

This internal space is closed at one extremity 42a and open at its opposite extremity 42b which corresponds to extremity 18a of the first portion.

This internal space is aligned with the longitudinal direction of the body 16 of the terminal and is adapted to receive the conductor 14 (FIG. 1) of the electrical cable 12.

In this embodiment, the first portion 18 is made of a conductive material such as a metal which can be for instance aluminum or copper.

Thus, this embodiment makes the arrangement of the thread 24 in the metallic first portion easier than in the plastic second portion.

Electrical conductivity is needed when it is required to transmit the electrical potential V from the conductor of the cable to an electrode outside the body and which is not represented in the figures.

This is necessary when the cable is kept under voltage.

The first portion 18 of the body also comprises means for fixing the conductor of the cable inside the internal space 42.

In this embodiment, the fixing means comprise two screwing means 44 and 46 which are arranged in a peripheral wall 48 of the first portion 18 and which surrounds the internal space 42.

The screwing means are for example of the break-off or shearable head type.

More particularly, two threaded holes 50, 52 represented in FIG. 1 are provided in the wall 48 and are offset along the longitudinal direction of the body.

When the conductor of the cable is introduced in the internal space 42, then the screwing means are operated until their extremities come into contact with the conductor and the respective screw heads break off, thereby achieving a very effective fixing of the conductor to the first portion of the body.

It will be understood that these fixing means are adapted to cooperate with conductors of different sizes of which cross-sections extend for instance from 50 to 630 mm².

It is to be noted that screwing means of different lengths are used as a function of the diameter of the conductor.

After the heads of the respective screwing means break off, the screwing means are flush mounted in the wall 48, thereby leading to a substantially constant outer diameter of the first portion 18 of the body.

By allowing the screwing means to cooperate with conductors of different sizes, it is no longer necessary to have different terminals for different sizes of conductors.

In this embodiment, the means for fixing the conductor inside the internal space 42 participate in the transmission of the potential V from the conductor to an outer electrode (not represented in the drawings), as well as the whole first portion 18.

However, when conductors of appropriate sizes are introduced in the internal space 42 and come into contact with the inner surface 42c of the internal space 42, whilst no screwing operation is in progress, then the screwing means do not need to transmit the potential V from the conductor to the outer electrode.

Nevertheless, when the terminal according to the invention is intended for cooperating with a great range of conductors of different sizes, then it is preferable to use screwing means which not only fix the conductor to the body but also participate in the transmission of the electrical potential of the conductor to the outer electrode.

It should be noted that a single screwing means can be sufficient when it is only required to fix the conductor of the cable to the first portion of the body and to transmit the potential of the conductor to an outside electrode.

However, a single screwing means could be insufficient when it is also required to transmit an electrical current of high intensity.

Figure 1C:
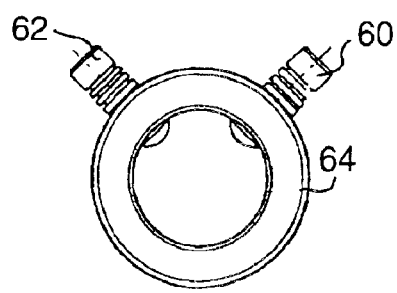
FIG. 1c depicts the arrangement of the screwing means represented in FIG. 1 in a variant of embodiment.

In a variant of embodiment represented in FIG. 1c, the two screwing means 60 and 62 are arranged in the wall of the first portion 64 of the body and transversally offset to one another.

Although it is not depicted in FIG. 1c, the screwing means can be also offset along the longitudinal direction.

Advantageously, when the two screwing means are transversally offset to one another, a better electrical and mechanical contact can be achieved.

Figure 2:
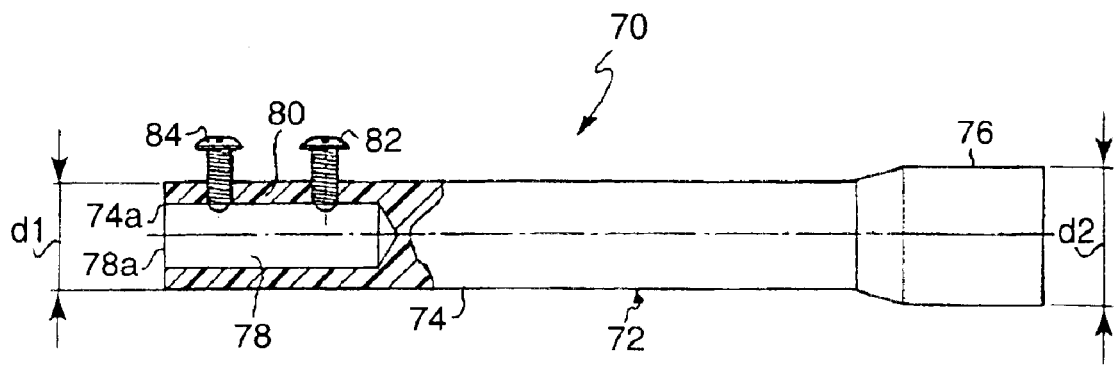
FIG. 2 depicts a longitudinal cross-section of a terminal according to a second embodiment.

A terminal 70 according to a second embodiment of the invention is depicted in FIG. 2.

This terminal is in the form of a body of generally longitudinal shape which is only made of an insulating material, for instance polypropylene.

In this embodiment, the body 72 of the terminal 70 presents, along a major portion of its longitudinal dimension, a substantially cylindrical shape 74 having a substantially constant transverse dimension $d_1$ and, on the remaining portion 76 of its longitudinal dimension, a form with transverse dimension $d_2$ greater than the transverse dimension $d_1$.

This remaining portion 76 is also substantially cylindrical in shape.

The major portion 74 is provided with an internal space 78 which is aligned with the longitudinal axis of the body 72 and which is open at its extremity 78a, corresponding to the extremity 74a of the major portion 74, in order to receive conductors of different sizes of electrical cables.

The wall 80 of the portion 74 which is provided with the internal space 78 is similar to the corresponding part of the first portion 18 in FIG. 1a.

This wall includes two screwing means 82 and 84 of which the head has a rounded shape.

The screwing means have different lengths according to the diameter of the conductor of the cable.

The head of the screwing means is shaped so as to be flush mounted in the wall 80 when the screwing operation is terminated and the extremities of the screwing means are in contact with the conductor.

Figure 3:
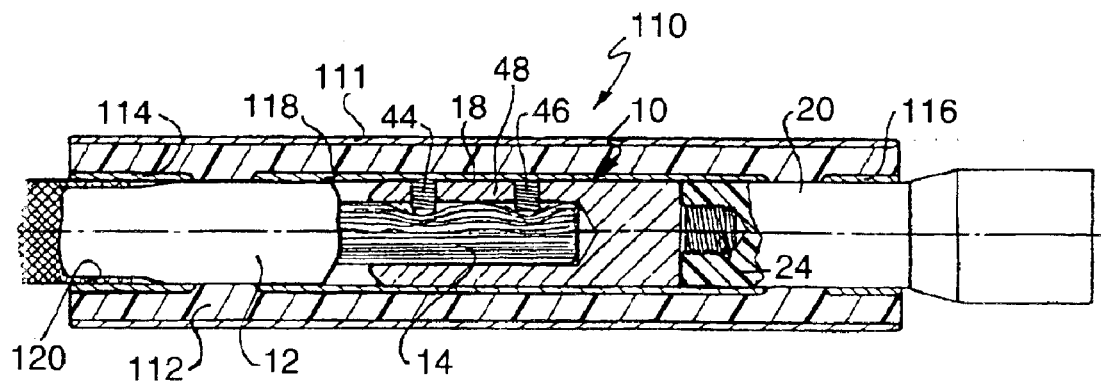
FIG. 3 depicts a longitudinal cross-section of the terminal of FIG. 1 enclosed within a sleeve.

As depicted in FIG. 3, the terminal of FIGS. 1 and 1a is enclosed in a radially shrinkable cylindrical sleeve such as that one described in EP 0 435 569 which is hereby incorporated by reference.

Other sleeves or the like which are designed for covering connections or terminals can be used alternatively.

Prior to the enclosing operation of the terminal inside the sleeve, the end of the medium voltage electrical cable is protected as described thereafter.

The end of the conductor 14 of the cable 12 whose insulation sheath has been removed is engaged within the internal cavity 42 until it comes into contact with the end face 42a.

Then, the two screwing means 44 and 46 are operated until their respective extremities come into tight contact with the conductor and their respective heads break off so that the screwing means are thus flush mounted in the wall 48.

The mechanical fixing of the end of the conductor 14 to the first extremity of the body of the terminal 10 is terminated and the end of the cable is therefore quickly and easily protected.

The protection of the end of the cable is implemented in the same way for the terminal of FIG. 2.

Next, the terminal which is fixed to the cable is enclosed within the sleeve 110 as mentioned above.

The sleeve 110 is annularly cylindrical and includes an outer layer 111, a middle layer 112 and an inner layer which is composed of two end portions 114, 116 and a middle portion 118 which is spaced from the end portions.

The outer layer 111 has a uniform wall thickness and consists of semiconductive material.

The middle layer consists of an insulative cured liquid-silicone rubber.

The end portions 114, 116 consist of stress controlling dielectric material.

The middle portion 118 acts as an electrode and consists of semiconductive material.

All layers of sleeve 110 shown are of elastic material so that it can be radially stretched to a sufficient amount.

In the sleeve 110, the portions 114, 116 and 118 are embedded in the insulation material but the outer surface of the sleeve 110 has a constant diameter.

Preferably, the portions 114, 116 and 118 have the same wall thickness.

When shrunk, the sleeve has also approximately a constant inner diameter.

Thus, once the terminal is enclosed within the sleeve 110, the wall 48 of the first portion 18 as well as the flush mounted screwing means 44 and 46 are in contact with the outer electrode 118.

It is to be noted that an electrically semi-conductive screen 120 which surrounds the insulation sheath 12 is also in contact with the electrode 114.

The substantially constant outer diameter d1 of the terminal 10 makes it possible to enclose this terminal within the sleeve 110 depicted in FIG. 3 without requiring any modification of the latter.

The sleeve 110 and the terminal 10 with its insulating portion 20 are covered with an additional protective sleeve (not shown) which extends over both sleeve 110 and terminal 10. The enlarged end 16b of the insulating portion 20 ensures an appropriate sealing.

The above described embodiments have to be understood as examples, the invention being not limited thereto.

What is claimed is:

1. A terminal for a medium voltage electrical cable having a conductor that can be raised to a potential V, characterized in that the terminal is in the form of a body of generally longitudinal shape, said terminal having two extremities, a first extremity and an opposite second extremity, comprising, at the first extremity, a means for fixing the conductor of the electrical cable to said body and means for transferring the potential V from the conductor to an electrode on the outside of the body, wherein the means for fixing the conductor at least partially provides the transferring of the potential from the conductor to the electrode on the outside of the body, and wherein at least the second extremity of the body performs an insulation function, the second extremity of the body providing a closed insulative end of the terminal.

2. Terminal according to claim 1, characterized in that a portion of body adjacent said first extremity has an internal space to receive the conductor of the electrical cable and further comprises means for fixing the conductor inside said internal space, wherein the fixing means are adapted to cooperate with conductors of different sizes.

3. Terminal according to one of claim 1, characterized in that the means for fixing comprise at least one screwing means arranged in a wall of the body which surrounds the internal space and which, under the action of a screwing operation, terminates in said internal space.

4. Terminal according to claim 3, characterized in that the means for fixing comprise two screwing means, wherein the two screwing means are offset along the longitudinal direction or transversally with respect to each other.

5. Terminal according to claim 4, characterized in that the screwing means are of the break-off head type.

6. Terminal according to claim 1, characterized in that the means for fixing is selected from the group consisting of crimping, soldering, welding, and clamping.

7. Terminal according to claim 1, characterized in that the body comprises two integrally joined portions, a first portion, comprising the first extremity formed of a conductive material, and a second portion, comprising the second extremity formed from an insulating material.

8. Terminal according to claim 7, characterized in that the two portions are integrally joined by a method selected from screwing, machanical jointing, bonding, crimping, stamping, or a heat treatment by melting parts of the insulating material.

9. Terminal according to claim 1, characterized in that a portion of the body has an internal space to receive and fix the conductor of the electrical cable, the body is formed from an insulating material, and the means for fixing the conductor inside the internal space is made of a conductive material.

10. Terminal according to claim 1, characterized in that the body, along a major portion of its longitudinal dimension, has a substantially cylindrical shape which possesses a substantially constant transverse dimension $d_1$, and along a minor portion of its longitudinal dimension, has a form with transverse dimension $d_2$ greater than the transverse dimension $d_1$.

* * * * *

UNITED STATES PATENT AND TRADEMARK OFFICE
CERTIFICATE OF CORRECTION

PATENT NO. : 6,948,955 B2
DATED : September 27, 2005
INVENTOR(S) : Ducrot, Alain It is certified that error appears in the above-identified patent and that said Letters Patent is hereby corrected as shown below:

<u>Column 8,</u>
Line 29, delete "according to one of claim" and insert -- according to claim --.
Line 51, delete "machanical" and insert -- mechanical --.

Signed and Sealed this

Fourth Day of April, 2006

JON W. DUDAS
*Director of the United States Patent and Trademark Office*